3,567,384
CARBON BLACK PRODUCTION
William T. Nelson and Marvin M. Johnson, Bartlesville, Okla., assignors to Phillips Petroleum Company
No Drawing. Filed Mar. 24, 1969, Ser. No. 809,934
Int. Cl. C09c 1/48
U.S. Cl. 23—209.5                                          10 Claims

ABSTRACT OF THE DISCLOSURE

A process for the production of carbon black by conversion of carbon monoxide in a hydrocarbon medium under reaction conditions above the critical temperature of the carbon monoxide, in the presence of a catalyst which is a dicyclopentadienyl derivative of a Group VIII metal of the Periodic Table.

---

This invention relates to carbon black production.

In one of its more specific aspects this invention relates to the production of carobn black from carbonaceous materials.

Carbon black is most frequently produced from hydrocarbons by one of several processes. Such processes are, however, limted to the use of liquid or vaporous hydrocarbons as the raw materials.

There has now been developed a process for the production of carbon black which can employ a wide variety of raw materials. In general, this process employs as a raw material any carbonaceous material which is convertible to carbon monoxide by controlled oxidation.

According to the method of this invention there is provided a process for the production of carbon black which comprises absorbing carbon monoxide in a hydrocarbon solvent and converting the carbon monoxide to carbon black in the presence of a catalyst which is a dicyclopentadienyl derivative of the Group VIII metals of the Periodic Table, the conversion being conducted at a temperature above the critical temperature of the carbon monoxide and in the presence of a solvent having a critical temperature above the temperature at which the reaction is conducted.

In one embodiment of this inevntion, the reaction is conducted in the presence of an oxide of a metal of Group VIII of the Periodic Table (Handbook of Chemistry and Physics, Chemical Rubber Company, 45th edition, 1964, p. B–2), such oxide being, for example, $Fe_2O_3$, $FeO$ or $Fe_3O_4$.

Accordingly, it is an object of this invention to provide a process suitable for conversion of a wide variety of materials to carbon black.

It is another object of this invention to provide a high yield process for producing carbon black.

The method of this invention contemplates use, as raw material, any oxidizable carbonaceous material such as coal, lignite, char, petroleum coke, pitches or asphaltic residues from which carbon monoxide can be produced. Generally, the carbon monoxide is produced by oxidation of the carbonaceous material, the carbon monoxide being routed to the reaction zone. Materials can be oxidized external of the reaction zone or within the reaction zone, itself, although geneartion of the carbon monoxide external of the reaction zone is preferable, since such geneartion permits substantial purification of the generated gases of those materials which are deleterious to the catalyst and whose removal is advisable from the standpoint of obtaining improved catalyst life. While the carbon monoxide-containing stream can contain such extraneous gases as hydrogen, nitrogen, carbon dioxide, hydrocarbons and other gases inert to the catalyst, it is preferable that the carbon monoxide be substantially free of such materials as hydrogen sulfide, carbonyl sulfide, and the like. The carbon monoxide which is introduced into the liquid hydrocarobn reaction medium which forms the reaction zone will be, in effect, dissolved therein. While the gas stream can contain materials other than carbon monoxide, the carbon monoxide content of the gas stream should be at least 20 percent by volume.

The solvent which is employed as the reaction medium may be any of the high boiling hydrocarbons, either paraffin or cycloparaffin or mixtures thereof, having a critical temperature greater than the reaction temperature. Such solvents include cetane, normal pentadecane, normal eicosane, alkylcyclopentanes in which at least one alkyl group having at least 10 carbon atoms is present, alkylcyclohexanes in which at least one alkyl group having at least 9 carbon atoms is present, and similar higher cycloparaffins or alkylcycloparaffins containing a total of at least 15 carbon atoms.

The catalysts which are employed can be generally classified as dicyclopentadienyl derivatives of a metal of Group VIII of the Periodic Table, or mixtures thereof. Suitable materials are, for example, ferrocene, cobaltocene, nickelocene, palladocene, platinocene, and alkyl derivatives thereof having no more than two alkyl groups containing no more than 4 carbon atoms per group on each cyclopentadiene ring. Suitable catalysts can be soluble in the hydrocarbon solvent reaction medium and can be added thereto in any suitable form in from about 0.0002 to about 0.2 mol of the metal per 100 parts by weight of the liquid hydrocarbon, preferably from about 0.002 to about 0.05 mol of the metal per 100 parts by weight of the liquid hydrocarbon. The hydrocarbon reaction medium containing the catalyst will be supplied in a quantity to provide about 0.0002 to about 0.05 mol of the metal per mol of the carbon monoxide passed through or contained in the reaction medium.

As previously mentioned, the reaction zone will be maintained at a temperature above the critical temperature of the carbon monoxide but at a temperature below the critical temperature of the hydrocarbon solvent, such temperatures being generally from about 750° F. to about 1000° F. at pressures from about atmospheric to about 4000 p.s.i.g.

The reaction can be conducted batchwise, in which case the carbon monoxide-containing gas is contacted within the hydrocarbon reaction medium containing a catalyst for a period of time with suitable agitation, after which, the carbon black is recovered by known separation means from the hydrocarbon reaction medium.

The reaction can also be conducted continuously by contacting the carbon monoxide-containing gas stream with the catalyst-containing reaction medium, preferably countercurrently, the gas stream being taken overhead from the contactor and being fortified with additional carbon monoxide before being recycled, the carbon black being recovered from the hydrocarbon reaction medium of the contact zone by conventional separation steps.

The following is an example of the batch operation of the method of this invention.

A quantity of 1.9 grams (0.0102 mol) of ferrocene was dissolved in 77 grams of normal hexadecane and placed in a reaction zone which was evacuated to remove air. The reaction zone was pressurized to 1000 p.s.i.g. with carbon monoxide of approximately 99 percent purity. The reaction zone was agitated and repressurized to 1000 p.s.i.g. twice and then heated to about 816° F. over a period of about two and one-third hours. The temperature was maintained between about 763° and about 832° F. for a period of about 5 hours after which time agitation was discontinued, and the reaction zone allowed to cool to about 70° F. Under these conditions the pressure of the reaction zone was 700 p.s.i.g.

The material balance for the system indicated the following:

Quantity of carbon monoxide consumed, gms. ____ 21.1
Theoretical carbon black yield, gms. _____ 4.5
Actual carbon black yield, gms. (ash-free basis) __ 4.0
Yield, percent of theoretical _____ 89.0

Properties of the carbon black produced were as follows:

Nitrogen surface area—68 sq. meters per gram
Iodine adsorption—57 mg. iodine per gram
Ash content, wt. percent—22.7

These data indicate the operability of the process to produce carbon black.

This method indicates a process suitable for converting a wide range of materials to carbon black at high yields.

As mentioned, in one embodiment of this invention, the reaction is conducted in the presence of an oxide of a metal of Group VIII of the Periodic Table. Preferably, such oxides are included in the reaction zone, individually or collectively, in quantities from about 0.0002 to about 0.05 mol of metal per mol of the carbon monoxide.

The following exemplifies the process when adding such an oxide:

In a batch operation, 0.10 gram of ferrocene was dissolved in 49.5 grams of cetane and to the resulting solution 0.09 gram of ferric oxide ($Fe_2O_3$) were added. The resulting reaction zone was pressurized to 1300 p.s.i.g. with carbon monoxide and during a period of two hours was heated to 780° F. while being agitated. The reaction zone was maintained between 780° F. and 840° F. for about four hours after which it was cooled to ambient temperature. The reaction zone was vented to atmospheric pressure and then repressurized to 1300 p.s.i.g. with carbon monoxide and reheated, with agitation, during a period of about two hours to about 820° F. The temperature was maintained within the range of about 820° F. to 840° F. for about three to four hours, after which the reaction zone was cooled to ambient conditions and vented.

The reaction zone was pressurized with carbon monoxide to about 850 p.s.i.g. and the heating procedure repeated, the total amount of carbon monoxide added being 68.0 grams. Upon cooling to ambient temperature, the carbon black reaction product was recovered.

The material balance for the system indicated the following:

Quantity of carbon monoxide consumed, gms. ____ 44.4
Theoretical carbon black yield, gms. _____ 9.5
Actual carbon black yield, gms. (ash-free basis) __ 9.0
Yield, percent of theoretical _____ 95

Properties of the carbon black produced were as follows:

Nitrogen surface area, m.²/gm. _____ 110
Ash content, wt. percent _____ 2.03

The above runs indicate the operability of the process in the presence of an oxide of a metal of Group VIII of the Periodic Table.

It will be appreciated that various modifications can be made to the embodiment of the invention as set forth herein. For example, the carbon monoxide gas can be dissolved in the liquid hydrocarbon medium which can then be circulated into contact with a bed of catalyst, the product carbon black being separated from the recirculated hydrocarbon medium and additional carbon monoxide being added to the hydrocarbon medium prior to or upon its reintroduction to the catalyst. However, these and other modifications are considered as being within the scope of the art.

What is claimed is:

1. A process for the production of carbon black which comprises heating carbon monoxide in a liquid hydrocarbon medium in the presence of a catalyst which is a dicyclopentadienyl derivative of a metal of Group VIII of the Periodic Table to a temperature above the critical temperature of the carbon monoxide but below the critical temperature of the liquid hydrocarbon medium and separating carbon black from the liquid hydrocarbon medium.

2. The process as defined in claim 1 in which the liquid hydrocarbon is selected from the group consisting of cetane, normal pentadecane, normal eicosane, alkylcyclopentanes in which at least one alkyl group has at least ten carbon atoms, alkylcyclohexanes in which at least one alkyl group has at least nine carbon atoms and alkylcycloparaffins having at least fifteen carbon atoms.

3. The process as defined in claim 1 in which the dicyclopentadienyl derivative is one selected from the group consisting of ferrocene, cobaltocene, nickelocene, palladocene and platinocene.

4. The process defined in claim 1 in which the reaction is conducted at a temperature from about 750° F. to about 1000° F. and a pressure from about atmospheric to about 4000 p.s.i.g.

5. The process defined in claim 1 in which the dicyclopentadienyl metallic derivative is present in the liquid hydrocarbon medium in an amount to provide from about 0.0002 to about 0.2 mol of the metal per 100 parts by weight of the liquid hydrocarbon.

6. The process defined in claim 1 in which the dicyclopentadienyl metallic derivative is present in the liquid hydrocarbon medium in an amount to provide from about 0.0002 to about 0.05 mol of the metal per mol of the carbon monoxide.

7. The process as defined in claim 1 in which the carbon monoxide is introduced within the liquid hydrocarbon medium by absorption effected by contacting the liquid hydrocarbon medium with a gas stream containing carbon monoxide.

8. The process as defined in claim 1 in which a gas stream containing at least 20 volume percent carbon monoxide is contacted with a liquid hydrocarbon medium containing ferrocene, the amount of ferrocene present providing from about 0.0002 to about 0.2 mol of iron in about 100 parts by weight of the liquid hydrocarbon medium, the liquid hydrocarbon medium being present in sufficient quantity to supply about 0.0002 to about 0.05 mol of iron per mol of said carbon monoxide, at a temperature from about 800° F. to about 1000° F. and a pressure from about atmospheric to about 4000 p.s.i.g.

9. The process as defined in claim 1 in which the reaction is conducted in the presence of an oxide of a metal of Group VIII of the Periodic Table.

10. The process as defined in claim 8 in which the reaction is conducted in the presence of an oxide of a metal of Group VIII of the Periodic Table in an amount to provide from about 0.0002 to about 0.05 mol of said metal per mol of the carbon monoxide.

References Cited

UNITED STATES PATENTS

| 1,803,855 | 5/1931 | Kramer et al. | 23—209.5 |
| 2,680,756 | 6/1954 | Pauson | 252—431X |
| 3,306,917 | 2/1967 | Shapiro et al. | 252—431X |

FOREIGN PATENTS

| 286,845 | 3/1928 | Great Britain | 23—209.5 |

EDWARD J. MEROS, Primary Examiner